US010483875B2

(12) United States Patent
Hsu et al.

(10) Patent No.: US 10,483,875 B2

(45) Date of Patent: Nov. 19, 2019

(54) SURFACE ELASTIC WAVE GENERATOR, TRANSCEIVER, AND GENERATION METHOD THEREOF

(71) Applicant: Industrial Technology Research Institute, Hsinchu (TW)

(72) Inventors: Feng-Chia Hsu, Kaohsiung (TW); Tsun-Che Huang, Tainan (TW); Jyun-Cheng Huang, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 863 days.

(21) Appl. No.: 14/290,995

(22) Filed: May 30, 2014

(65) Prior Publication Data

US 2015/0137660 A1 May 21, 2015

(30) Foreign Application Priority Data

Nov. 20, 2013 (TW) ............................ 102142344 A

(51) Int. Cl.
*H02N 1/00* (2006.01)

(52) U.S. Cl.
CPC .................................. *H02N 1/002* (2013.01)

(58) Field of Classification Search
CPC ................................ H02N 1/002; H02N 1/08
USPC ................................................. 310/306, 309
See application file for complete search history.

(56) References Cited

U.S. PATENT DOCUMENTS 4,129,798 A * 12/1978 Defranould ............ G10K 11/36 257/416
4,353,046 A 10/1982 Hartmann
6,131,257 A 10/2000 Nishihara et al.
6,720,710 B1 * 4/2004 Wenzel ............... B01L 3/50273 310/328
7,190,241 B2 * 3/2007 Ebata ................. H03H 9/02921 333/133

(Continued)

FOREIGN PATENT DOCUMENTS

CN 1351420 5/2002
CN 1705227 12/2005

(Continued)

OTHER PUBLICATIONS

"Office Action of Taiwan Counterpart Application", dated Nov. 10, 2015, p. 1-p. 5.

(Continued)

*Primary Examiner* — Mang Tin Bik Lian
*Assistant Examiner* — Leda T Pham
(74) *Attorney, Agent, or Firm* — JCIPRNET

(57) ABSTRACT

A surface elastic wave generator may include a substrate. A first conductivity type region is formed in the substrate. A second conductivity type doped region includes at least one doping pattern doped on surface of the first conductivity type region. Through applying reverse bias to junctions between the first conductivity type region and the second conductivity type doped region, a depletion capacitance region is formed. Also, through inputting signal to the first conductivity type region or the second conductivity type doped region, the surface elastic wave is generated on the substrate. In addition, a surface elastic wave transceiver and surface elastic wave generation method are also provided.

30 Claims, 18 Drawing Sheets

(56) References Cited

U.S. PATENT DOCUMENTS

| | | | |
|---|---|---|---|
| 9,073,085 B2 * | 7/2015 | Kandori | B06B 1/0292 |
| 2009/0096548 A1 | 4/2009 | Hopper | |
| 2010/0171569 A1 | 7/2010 | Ionescu et al. | |
| 2011/0024812 A1 | 2/2011 | Weinstein et al. | |
| 2012/0146153 A1 * | 6/2012 | Wen | H01L 21/6835 257/368 |
| 2012/0194282 A1 | 8/2012 | Hwang et al. | |
| 2013/0033338 A1 | 2/2013 | Wang et al. | |
| 2013/0099629 A1 | 4/2013 | Ayazi et al. | |

FOREIGN PATENT DOCUMENTS

| | | |
|---|---|---|
| CN | 1897460 | 1/2007 |
| CN | 103119847 | 5/2013 |
| EP | 2330738 | 6/2011 |
| JP | 2000295071 | 10/2000 |
| JP | 2004312397 | 11/2004 |
| JP | 2010045157 | 2/2010 |
| TW | 1248481 | 2/2006 |
| TW | 201110545 | 3/2011 |
| TW | 201203852 | 1/2012 |
| WO | 1981000489 | 2/1981 |
| WO | 2010058351 | 5/2010 |
| WO | 2013073374 | 5/2013 |

OTHER PUBLICATIONS

Eugene Hwang, et al., "Platform for JFET-based Sensing of RF MEMS Resonators in CMOS Technology," 2011 IEEE International Electron Devices Meeting (IEDM), Dec. 5-7, 2011, pp. 20.4.1-20.4.4.

Daniel Grogg, et al., "Multi-Gate Vibrating-Body Field Effect Transistor (VB-FETs)," 2008 IEEE International Electron Devices Meeting (IEDM), Dec. 15-17, 2008, pp. 1-4.

Siavash Pourkamali, et al., "Low-Impedance VHF and UHF Capacitive Silicon Bulk Acoustic Wave Resonators—Part I: Concept and Fabrication," IEEE Transactions on Electron Devices, vol. 54, No. 8, Aug. 2007, pp. 2017-2023.

Wentao Wang, et al., "An Unreleased MM-Wave Resonant Body Transistor," 24th International Conference on Micro Electro Mechanical Systems (MEMS), Jan. 23-27, 2011, pp. 1341-1344.

Eugene Hwang, et al., "PN-Diode Transduced 3.7-GHZ Silicon Resonator," 23rd International Conference on Micro Electro Mechanical Systems (MEMS), Jan. 24-28, 2010, pp. 208-211.

"Office Action of China Counterpart Application," dated May 9, 2017, p. 1-p. 7.

Office Action of China Counterpart Application, dated Jul. 18, 2018, pp. 1-7.

* cited by examiner

600'

SURFACE ELASTIC WAVE GENERATOR, TRANSCEIVER, AND GENERATION METHOD THEREOF

CROSS-REFERENCE TO RELATED APPLICATION

This application claims the priority benefit of Taiwan application serial no. 102142344, filed on Nov. 20, 2013. The entirety of the above-mentioned patent application is hereby incorporated by reference herein and made a part of this specification.

TECHNICAL FIELD

The technical field relates to a surface elastic wave generator, a transceiver and a generation method thereof, and more particularly to, a surface elastic wave generator using a depletion capacitance region to generate electrostatic force, a transceiver and a generation method thereof.

BACKGROUND

In recent year, with increasingly advanced technology industry, as well as increased demands for various types of consumer electronics product, resonators have become clock components for cars, TVs, cameras, portable electronics and other electronic equipments.

The electrostatically driven microelectromechanical (MEMS) resonators have been commercialized as frequency reference devices with an acceptable accuracy. The impedance of the MEMS resonators exhibits a high impedance, thereby causing limitations in applications of higher frequency and difficulties in processing back-end circuits. In addition, feed through capacitor signals of capacitive resonators are very large and thus have higher feed through. The MEMS resonators generally need a complex structure release etching process, and thus are difficult to be fabricated and are difficult to be integrated with complementary metal-oxide semiconductor transistors (CMOS) processing.

SUMMARY

The application may provide a surface elastic wave generator using a depletion capacitance region to generate electrostatic force, a transceiver and a generation method thereof.

The surface elastic wave generator of the application includes a substrate, a first conductivity type region and a second conductivity type doped region. The first conductivity type region is formed in the substrate. The second conductivity type doped region includes at least one doping pattern doped on a surface of the first conductivity type region. Through applying reverse bias to junctions between the first conductivity type region and the second conductivity type doped region, a depletion capacitance region is formed, and through inputting a signal to the first conductivity type region or the second conductivity type doped region, an elastic wave is generated on the substrate.

The surface elastic wave transceiver of the application includes a substrate, a transmitter and a receiver. The transmitter is formed in the substrate and includes a first region with a first conductivity type and a first doped region with a second conductivity type. The first doped region includes at least one first doping pattern doped on a surface of the first region with the first conductivity type. Through applying reverse bias between the first doped region and the first region with the first conductivity type, a depletion capacitance region is generated at junctions between the two regions, and through inputting a signal to the first region or the first doped region, a surface elastic wave is generated on the substrate. The receiver is formed in the substrate and includes a second region with a first conductivity type and a second doped region with a second conductivity type. The second doped region includes at least one second doping pattern doped on a surface of the second region with the first conductivity type.

The surface elastic wave generation method of the application includes the following steps. A substrate is provided, wherein the substrate has a first conductivity type region therein, and a surface of the first conductivity type region has a second conductivity type doped region. The second conductivity type doped region includes at least one doping pattern. Reverse bias is applied to junctions between the first conductivity type region and the second conductivity type doped region, so as to generate a depletion capacitance region. A signal is outputted to the first conductivity type region or the second conductivity type doped region, so that electrostatic force is generated between two ends of the depletion capacitance region, and the electrostatic force perturbs the surface of the substrate, thereby causing the surface elastic wave to spread along the surface of the substrate.

The surface elastic wave generator of the application includes a substrate, a first electrode plate set, a second electrode plate set and at least one dielectric material. The first electrode plate set is formed on the substrate, and the second electrode plate set is formed on the first electrode plate set. The at least one dielectric material are respectively disposed between the substrate and the first electrode plate set and between the first electrode plate set and the second electrode plate set. A difference may be generated between the first electrode plate set and the second electrode plate set through applying bias voltage, and a signal is inputted to the first electrode plate set or the second electrode plate set, so that a surface elastic wave is generated on the substrate.

The surface elastic wave transceiver of the application includes a substrate, a transmitter and a receiver. The transmitter is formed on the substrate and includes a first electrode plate set, a second electrode plate set and at least one dielectric material. The first electrode plate set is formed on the substrate, and the second electrode plate set is formed on the first electrode plate set. The at least one dielectric material are respectively disposed between the substrate and the first electrode plate set and between the first electrode plate set and the second electrode plate set. A difference may be generated between the first electrode plate set and the second electrode plate set through applying bias voltage, and a signal is inputted to the first electrode plate set or the second electrode plate set, so that electrostatic force is generated between two ends of a solid micro-capacitance region formed between the first electrode plate set and the second electrode plate set, and the electrostatic force perturbs the surface of the substrate, thereby generating a surface elastic wave on the substrate. The receiver is formed on the substrate and adapted to receive the surface elastic wave generated by the transmitter. A third electrode plate set is formed on the substrate and a fourth electrode plate set is formed on the third electrode plate set. The at least one dielectric material are respectively disposed between the substrate and the third electrode plate set and between the third electrode plate set and the fourth electrode plate set, and a difference is generated between the third electrode plate set and the fourth electrode plate set through applying bias voltage.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
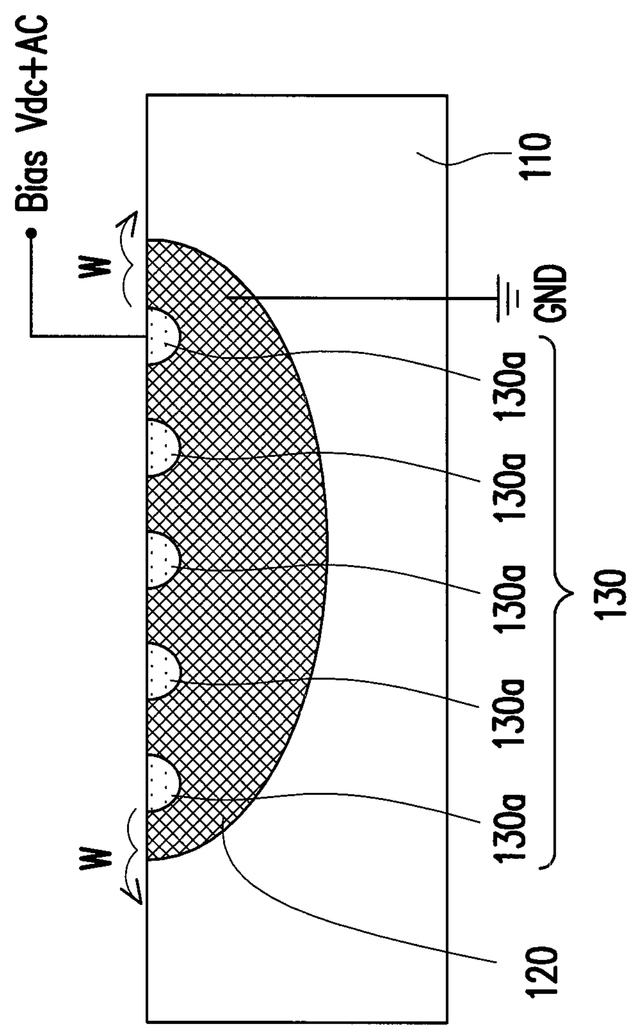
FIG. 1 is a schematic diagram illustrating a surface elastic wave generator according to an embodiment of the application.

FIG. 1 is a schematic diagram illustrating a surface elastic wave generator 100 according to an embodiment of the application. Referring to FIG. 1, the surface elastic wave generator 100 of the present embodiment includes a substrate 110, a first conductivity type region 120 and a second conductivity type doped region 130. The first conductivity type region 120 is formed in the substrate 110 via ion implantation. In addition, the second conductivity type doped region 130 includes at least one doping pattern **130*a* formed on a surface of the conductivity type region 120 via periodic implantation. The surface elastic wave generator 100 of the present embodiment, may enable the second conductivity type doped region 130 and the first conductivity type region 120 to generate a depletion capacitance region (not shown) therebetween through applying reverse bias Bias Vdc to junctions between the second conductivity type doped region 130 and the first conductivity type region 120, and may enable two ends of the depletion capacitance region to generate electrostatic force vibrate the surface of the substrate 110 through inputting an alternating current signal AC to the first conductivity type region 120 or the second conductivity type doped region 130, so that a spatially periodic electrostatic perturbation is generated on the surface of the substrate 110, thereby forming a surface elastic wave W to spread along the surface of the substrate 110**.

In the present embodiment, the substrate 110 of the surface elastic wave generator 100 may be a silicon substrate with high resistance, but the application is not limited thereto; the substrate 110 may also be formed with other appropriate semiconductor materials. With the high resistance characteristics of the substrate 110, feed through in the transmission process of the surface elastic wave W may effectively be inhibited.

In addition, even though the embodiment of the application has taken case of the first conductivity type being P-type and the second conductivity type being N-type as an example, it should be apparent to those skilled in the art that, through appropriate modifications, the first conductivity type may also be N-type and the second conductivity type may also be P-type.

In the present embodiment, a spatial implantation period between the doping patterns **130*a* is an integer multiple of or twice the wavelength of the surface elastic wave W; in other words, by adjusting a spatial ion implantation period, the present embodiment may change the wavelength of the surface elastic wave W, thereby changing the frequency of the surface elastic wave W. Thus, in the present embodiment, the spatial implantation period of the second conductivity type doped region 130 on the surface of the first conductivity type region 120 may be designed according to an operating frequency need by the surface elastic wave generator 100**. Through high concentration ion implantation, and producing a high dielectric fork-shaped depletion capacitance region, a depletion capacitance region spacing may effectively be reduced (e.g., to less than 100 nm). As the impedance is positively proportional to the depletion capacitance region spacing, while inversely proportional to the dielectric constant, the ion implantation may further achieve the purpose of reducing the impedance.

Figure 2:
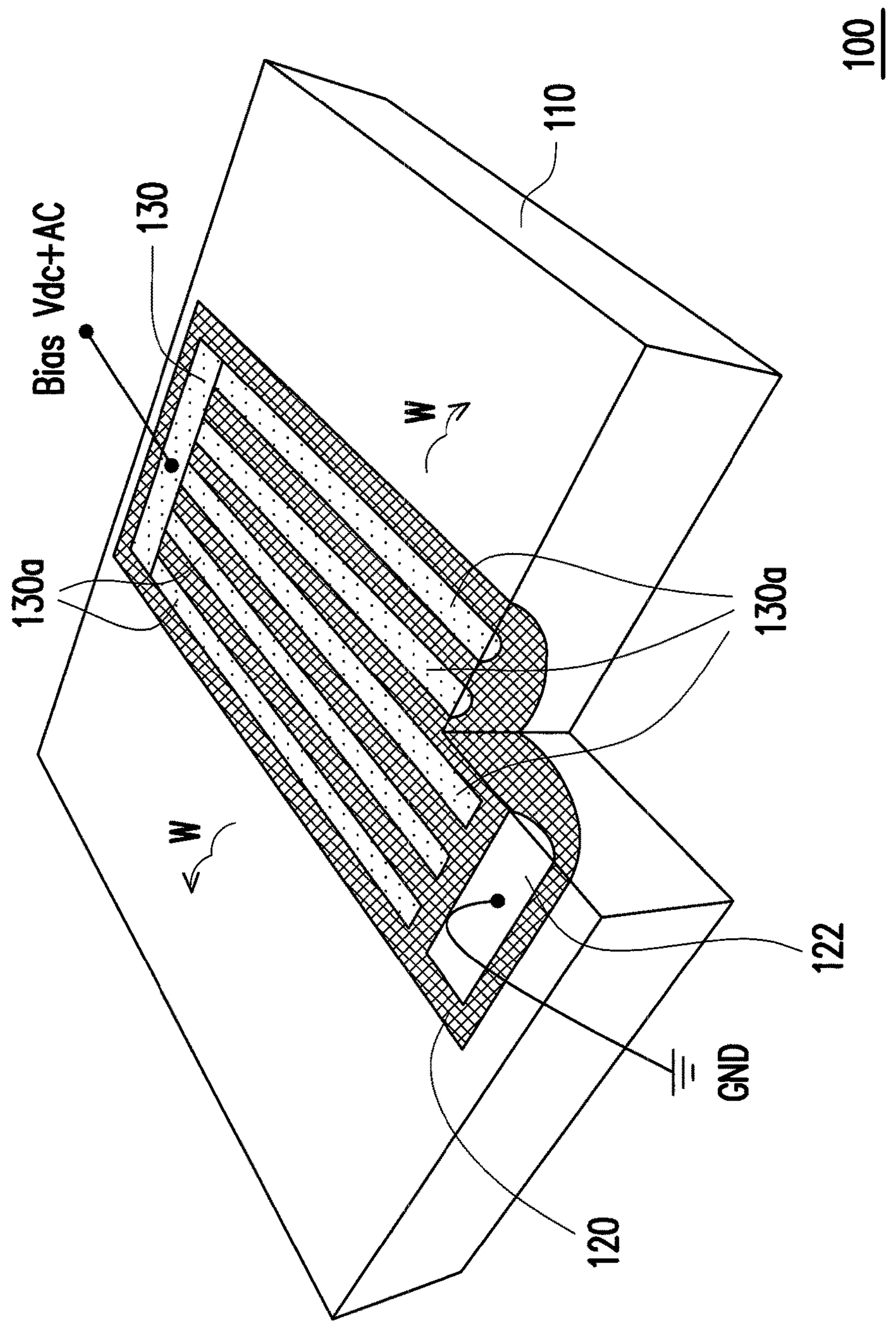
FIG. 2 is a top view of the surface elastic wave generator of FIG. 1.

FIG. 2 is a top view of the surface elastic wave generator 100 of FIG. 1. Referring to FIG. 2, the second conductivity type doped region 130 in FIG. 2 appears to be in fork-shapes, and the doping patterns **130*a* are a plurality of fork portions extended parallelly to each other. The bottom ends of the doping patterns 130***a* and the surface of the first conductivity type region 120 may, for example, respectively form a grounding electrode 122 and a conductive electrode (not shown) by depositing AlSiCu alloy or conductive metal via coating method such as physic vapor deposition (PVD). Next, by using the conductive electrode to apply the reverse bias Bias Vdc between the first conductivity type region 120 and the second conductivity type doped region 130, and to input the alternating current signal AC to the first conductivity type region 120 or the second conductivity type doped region 130, the surface elastic wave W is generated on the surface of the substrate 110. The first conductivity type region 120 is coupled to a ground voltage GND through the grounding electrode 122. Although the appearance of the second conductivity type doped region 130 of the present embodiment has taken the fork-shapes as an example, the application is not limited thereto, other appearance such as a plurality of periodically arranged rectangles may also be adopted, and the doping patterns corresponded thereof may be a plurality of extending portions extended parallelly to each other; it should be apparent to those skilled in the art that various modifications and variations can be made to the appearance of the second conductivity type doped region 130 of the disclosed embodiment without departing from the scope or spirit of the application.

Figure 3:
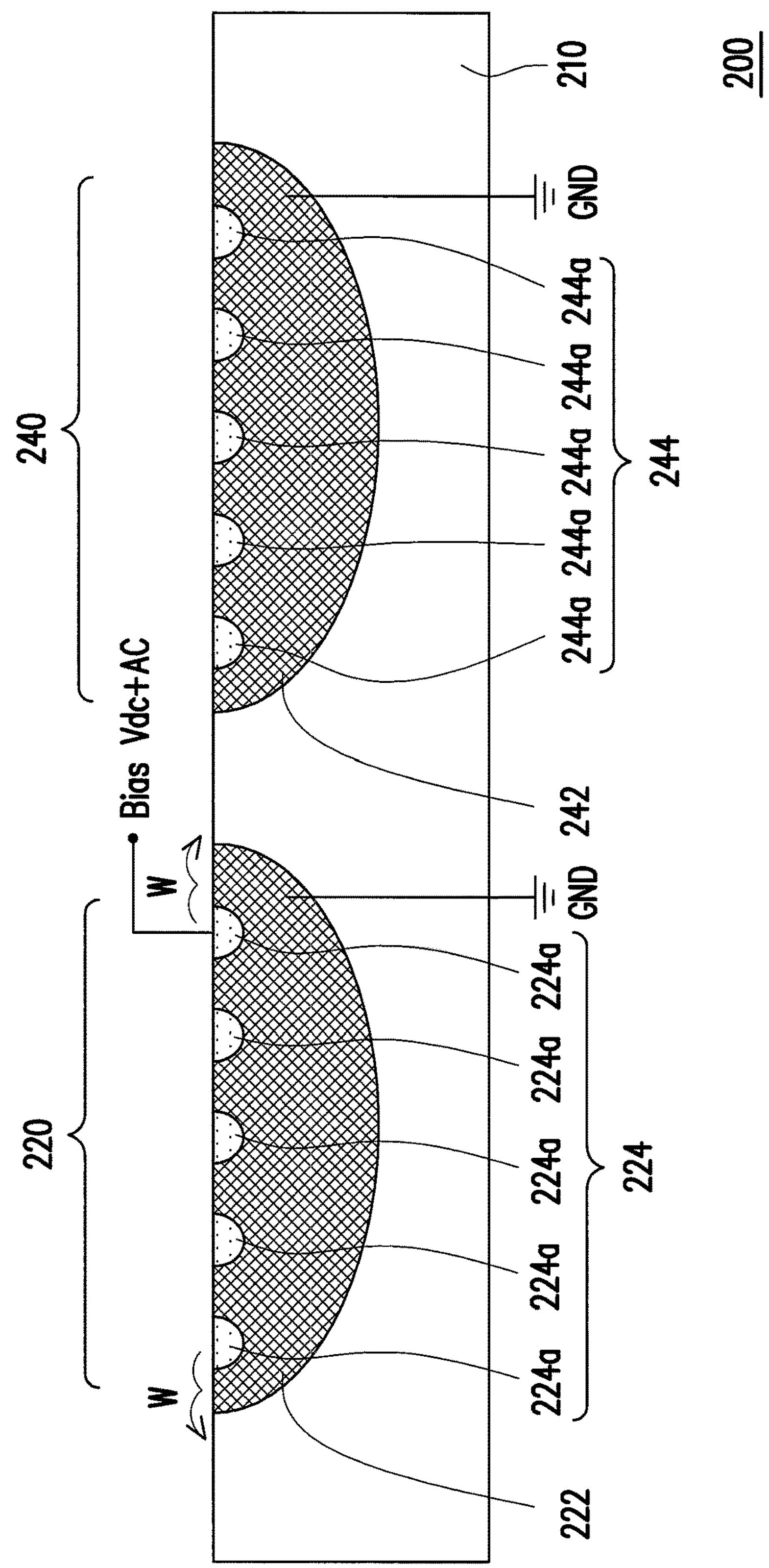
FIG. 3 is a schematic diagram illustrating a surface elastic wave generator according to another embodiment of the application.
Figure 4:
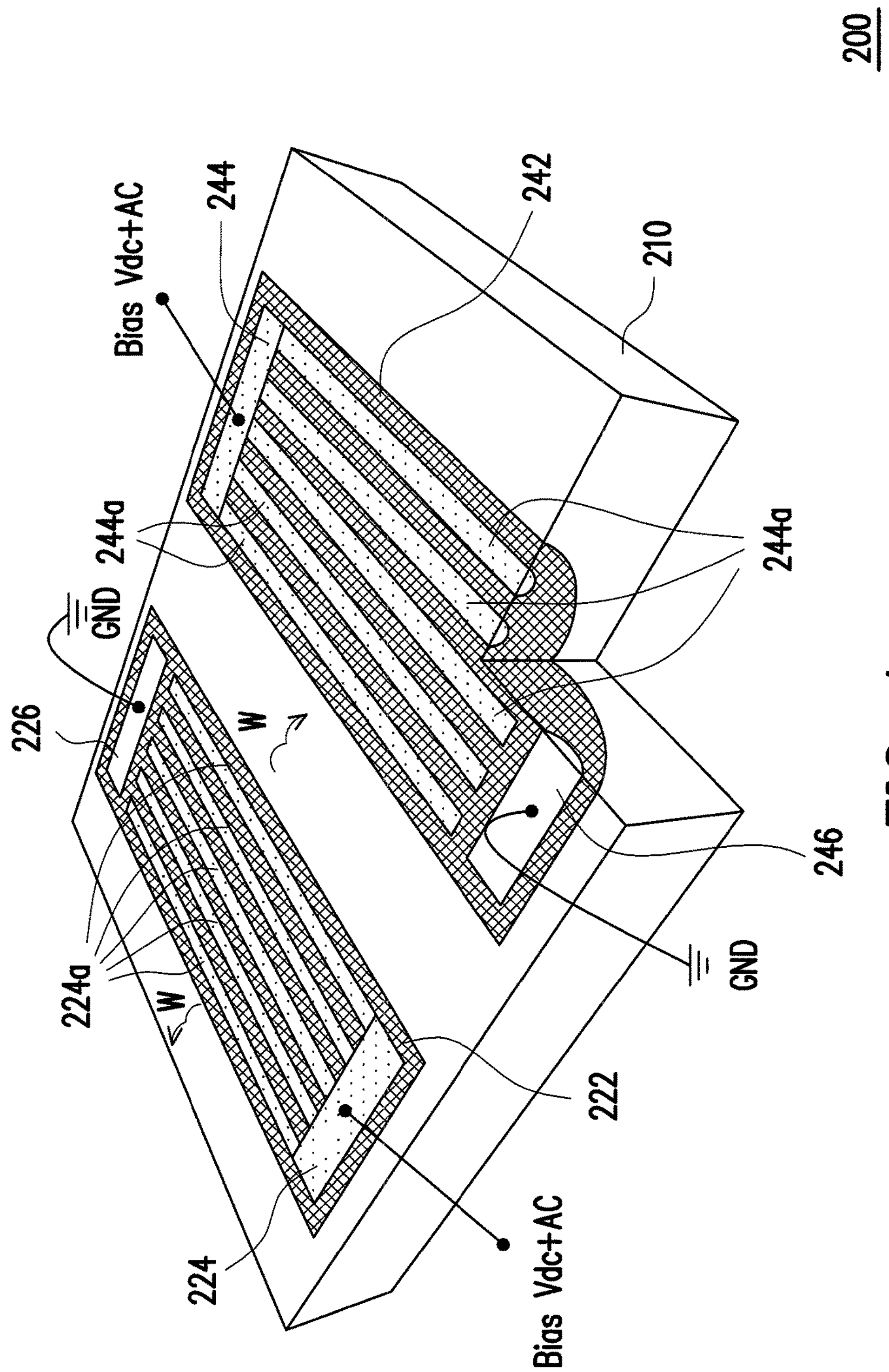
FIG. 4 is a top view of the surface elastic wave generator of FIG. 3.

FIG. 3 is a schematic diagram illustrating a surface elastic wave generator 200 according to another embodiment of the application. FIG. 4 is a top view of the surface elastic wave generator 200 of FIG. 3. Referring to FIG. 3, the surface elastic wave generator 200 includes a substrate 210, a transmitter 220 and a receiver 240. Wherein, the transmitter 220 is formed in the substrate 210 and includes a first region 222 with a first conductivity type and a first doped region 224 with a second conductivity type. The first doped region 224 includes a first doping pattern 224*a* periodically implanted on a surface of the first region 222, The transmitter 220 may enable the first doped region 224 and the first region 222 to generated a depletion capacitance region therebetween through applying the reverse bias Bias Vdc to junctions between the first doped region 224 and the first region 222, and enable two ends of the depletion capacitance region to generate electrostatic force to vibrate the surface of the substrate 210 through inputting an alternating current signal AC to the first region 222 or the first doped region 224, so that a spatially periodic electrostatic perturbation is generated on the surface of the substrate 210 surface, thereby causing the surface elastic wave W to spread along the surface of the substrate 210.

The receiver 240 is formed in the substrate 210 and includes a second region 242 with the first conductivity type and a second doped region 244 with the second conductivity type, wherein the second doped region 244 includes a second doping pattern 244*a* periodically implanted on a surface of the second region 242 and generates a depletion capacitance region through applying the reverse bias between the second region 242 and the second doping pattern 244*a* on the surface of substrate 210 surface. The receiver 240 perturbs a depletion capacitance region spacing through the surface elastic wave W generated by the transmitter 220 on the surface of the substrate 210 and generates an output current with the change in capacitance, wherein the amounts of change of the outputted alternating current and the capacitance per unit time are positively correlated.

In the present embodiment, the first conductivity type may, for example, be P-type and the second conductivity type may, for example, be N-type, but the application is not limited thereto; through appropriate modifications, the first conductivity type may also be N-type and the second conductivity type may also be P-type.

Referring to FIG. 4, the first doped region 224 and the second doped region 244 in FIG. 4 respectively appear to be in fork-shapes, and the first doping pattern 224*a* and the second doping pattern 244*a* respectively appear to be a plurality of fork portions extended parallelly to each other. The bottom ends of first doping pattern 224*a* and the second doping pattern 244*a* and the surfaces of the first region 222 and the second region 242 may, for example, respectively form grounding electrodes 226 and 246 and conductive electrodes (not shown) by depositing AlSiCu alloy or conductive metal via coating method such as physic vapor deposition (PVD). Next, the reverse bias Bias Vdc is respectively applied between the first region 222 and the first doped region 224, and between the second region 242 and the second doped region 244, through the conductive electrodes, the alternating current signal AC is inputted to the first region 222 or the first doped region 224 through the conductive electrode of the first region 222, and the alternating current signal AC is further being outputted through the conductive electrode of the second region 242.

The first region 222 and the second region 242 are respectively coupled to the ground voltage GND through the grounding electrodes 226 and 246. Although the appearances of the first doped region 224 and the second doped region 244 of the present embodiment have taken the fork-shapes or the plurality periodically arranged rectangles as an example, it should be apparent to those skilled in the art that various modifications and variations can be made to the appearances of the first doped region 224 and the second doped region 244 of the disclosed embodiment without departing from the scope or spirit of the application.

Figure 5:
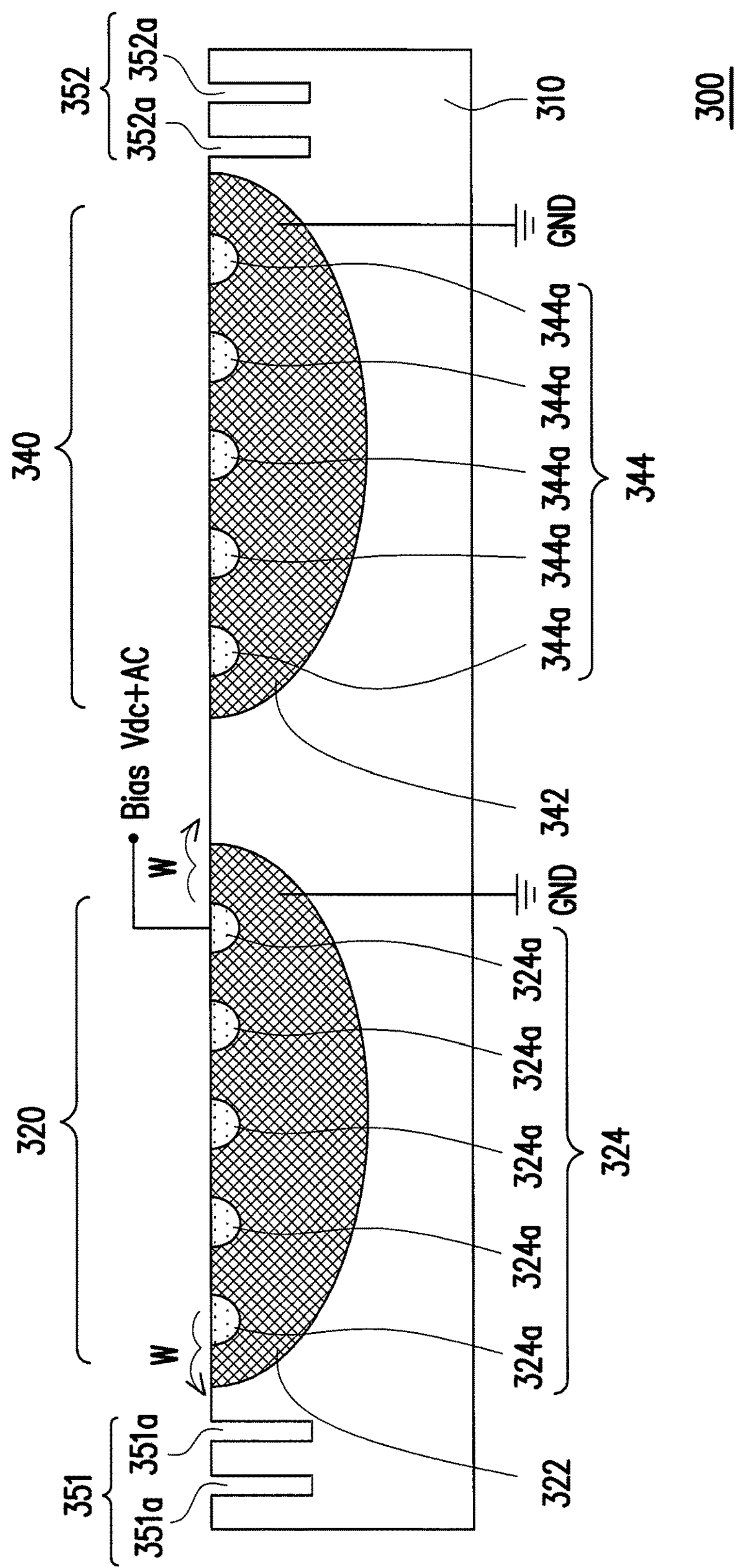
FIG. 5 is a schematic diagram illustrating a surface elastic wave transceiver according to another embodiment of the application.

FIG. 5 is a schematic diagram illustrating a surface elastic wave transceiver 300 according to another embodiment of the application. Referring to FIG. 5, the surface elastic wave transceiver 300 includes a substrate 310, a transmitter 320 and a receiver 340. Wherein, the transmitter 320 is formed in the substrate 310 and includes a first region 322 with a first conductivity type and a first doped region 324 with a second conductivity type, and the first doped region 324 includes a first doping pattern 324*a* periodically implanted on a surface of the first region 322. In addition, the receiver 340 is formed in the substrate 310 and includes a second region 342 with the first conductivity type and a second doped region 344 with the second conductivity type, wherein the second doped region 344 includes a second doping pattern 344*a* periodically implanted on a surface of the second region 342. Components similar to that of the previous embodiment may have similar structures and similar operating means, and thus are not to be repeated herein. The surface elastic wave transceiver 300 further includes a first reflective structure 351 and a second reflective structure 352 formed in the substrate 310, and the first reflective structure 351 or the second reflective structure 352 may be a plurality of grooves 351*a* and 352*a* that are parallel to each other on the surface of the substrate 310, thereby forming a discontinuous structure. In addition, the first reflective structure 351 or the second reflective structure 352 may also be made of other acoustic impedance materials, such as air, dielectric material or metal, which are different from the material of the substrate. By using the first reflective structure 351 and the second reflective structure 352 to reflect the surface elastic wave W to generate a standing wave with center frequency, in the design of the surface elastic wave transceiver 300, the depletion capacitance region may be disposed at a location with maximum stress of the standing wave mode, so as to enhance perturbation of the surface elastic wave W from the surface of the substrate 310 to the capacitance spacing, thereby forming a resonator with high electromechanical conversion efficiency.

In the present embodiment, although the grooves 351*a* and 352*a* are as illustrated in FIG. 5, it should be apparent to those skilled in the art that various modifications and variations can be made to the size and shapes of the grooves 351*a* and 352*a* of the disclosed embodiment without departing from the scope or spirit of the application. In addition, the grooves 351*a* and 352*a* may be fabricated through using semiconductor dry plasma etching or wet chemical etching techniques.

Figure 6:
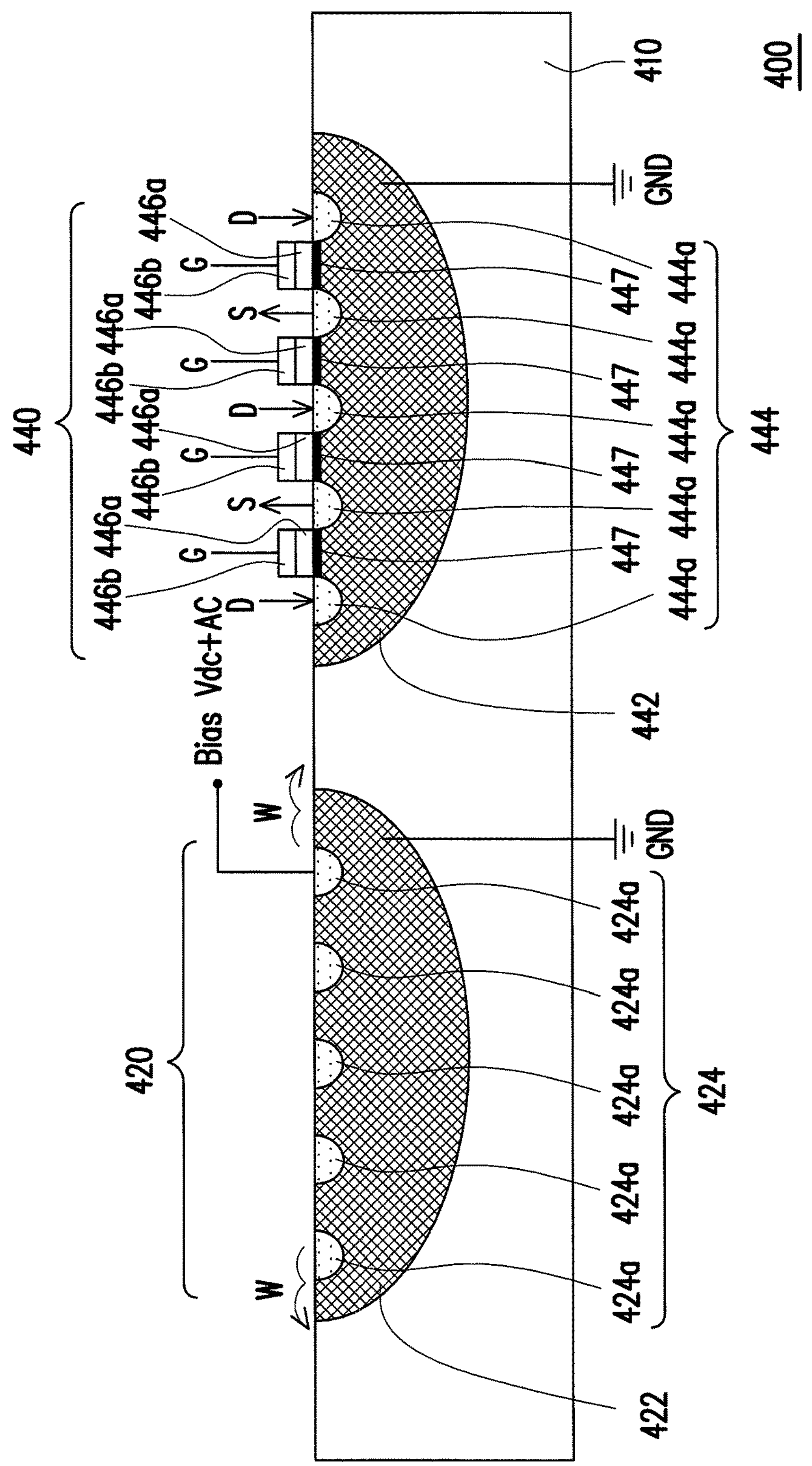
FIG. 6 is a schematic diagram illustrating a surface elastic wave transceiver according to yet another embodiment of the application.

FIG. 6 is a schematic diagram illustrating a surface elastic wave transceiver 400 according to yet another embodiment of the application. Referring to FIG. 6, the surface elastic wave transceiver 400 includes a substrate 410, a transmitter 420 and a receiver 440, wherein the transmitter 420 is formed in the substrate 410 and includes a first region 422 with a first conductivity type and a first doped region 424 with a second conductivity type. The first doped region 424 includes a plurality of first doping patterns 424*a* periodically implanted on a surface of the first region 422. In addition, the receiver 440 is formed in the substrate 410 and includes a second region 442 with the first conductivity type and a second doped region 444 with the second conductivity type, wherein the second doped region 444 includes a second doping pattern 444*a* periodically implanted on a surface of the second region 442. The surface elastic wave transceiver 400 further includes a plurality of gates G, and second doping patterns 444*a* at two sides of the gates G are respectively used as sources S and drains D, so that a plurality of field effect transistors is formed on a surface of the receiver 440 and to generated a plurality of channels 447 on the surface of the substrate 410 via gate voltage. The surface elastic wave W on the surface of the substrate 410 perturbs the channels 447 via stress and then causes the electron mobility of channels 447 to change, so that the alternating current is generated, wherein a magnitude of the electron mobility and a magnitude of the output current are positively correlated. In addition, a gain value of the output voltage may be adjusted through voltages ($V_{GS}$) between the gates G and the sources S.

In the present embodiment, each gate G further includes a gate dielectric layer 446*a* and a gate electrode 446*b*. The gate dielectric layers 446*a* may, for example, be composed of dielectric material such as silicon dioxide ($SiO_2$), but the application is not limited thereto. Other appropriate materials with high dielectric constant, such as aluminum oxide, hafnium oxide, silicon nitride, silicon oxynitride, or ceramics, may also be adopted. A material of the gate electrodes includes, but not limited to, one of tungsten, aluminum, gold, nickel, platinum, and chromium or an alloy thereof, and indium tin oxide (ITO). In addition, the field effect transistors of the present embodiment may, for example, be, but not limited to, complementary metal-oxide semiconductor transistors.

Figure 7:
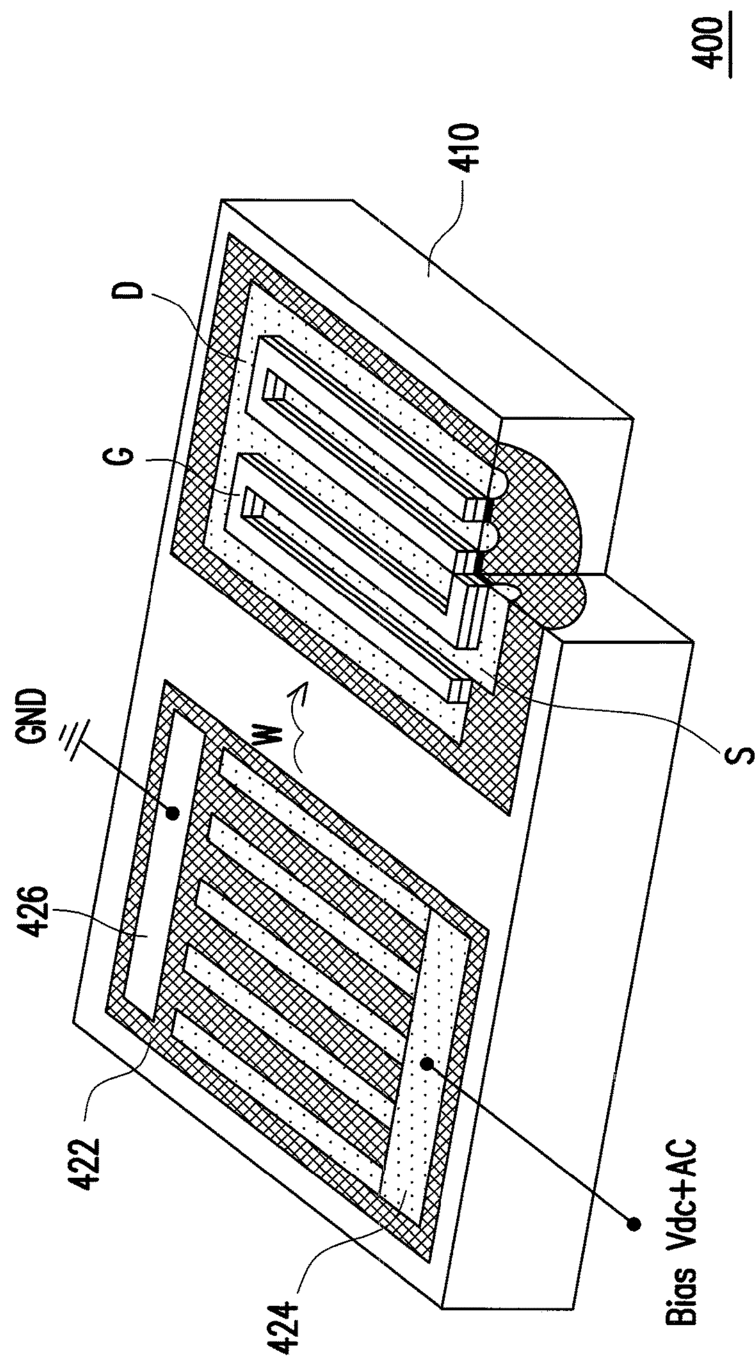
FIG. 7 is a top view of the surface elastic wave transceiver of FIG. 6.

FIG. 7 is a top view of the surface elastic wave transceiver 400 of FIG. 6. Referring to FIG. 7, the first doped region 424 in FIG. 7, and the sources S and the drains D, respectively appear to be in cross-fork-shapes; and the sources S and the drains D are alternatively arranged. In addition, the gates G are perpendicular to the sources S or the drains D or the gates G are parallelly formed between the source S and the drains D. The surface of the first region 422 may, for example, be deposited with AlSiCu alloy or conductive metal via coating method such as physic vapor deposition or be formed with a grounding electrode 426 and a conductive electrode (not shown) thereon. By using the conductive electrode to apply the reverse bias Bias Vdc between the first region 422 and the first doped region 424, and to input the alternating current signal AC to the first region 422 or the first doped region 424, the surface elastic wave W is generated on the surface of the substrate 410. In addition, the first region 422 is coupled to the ground voltage GND through the grounding electrode 426.

Figure 8:
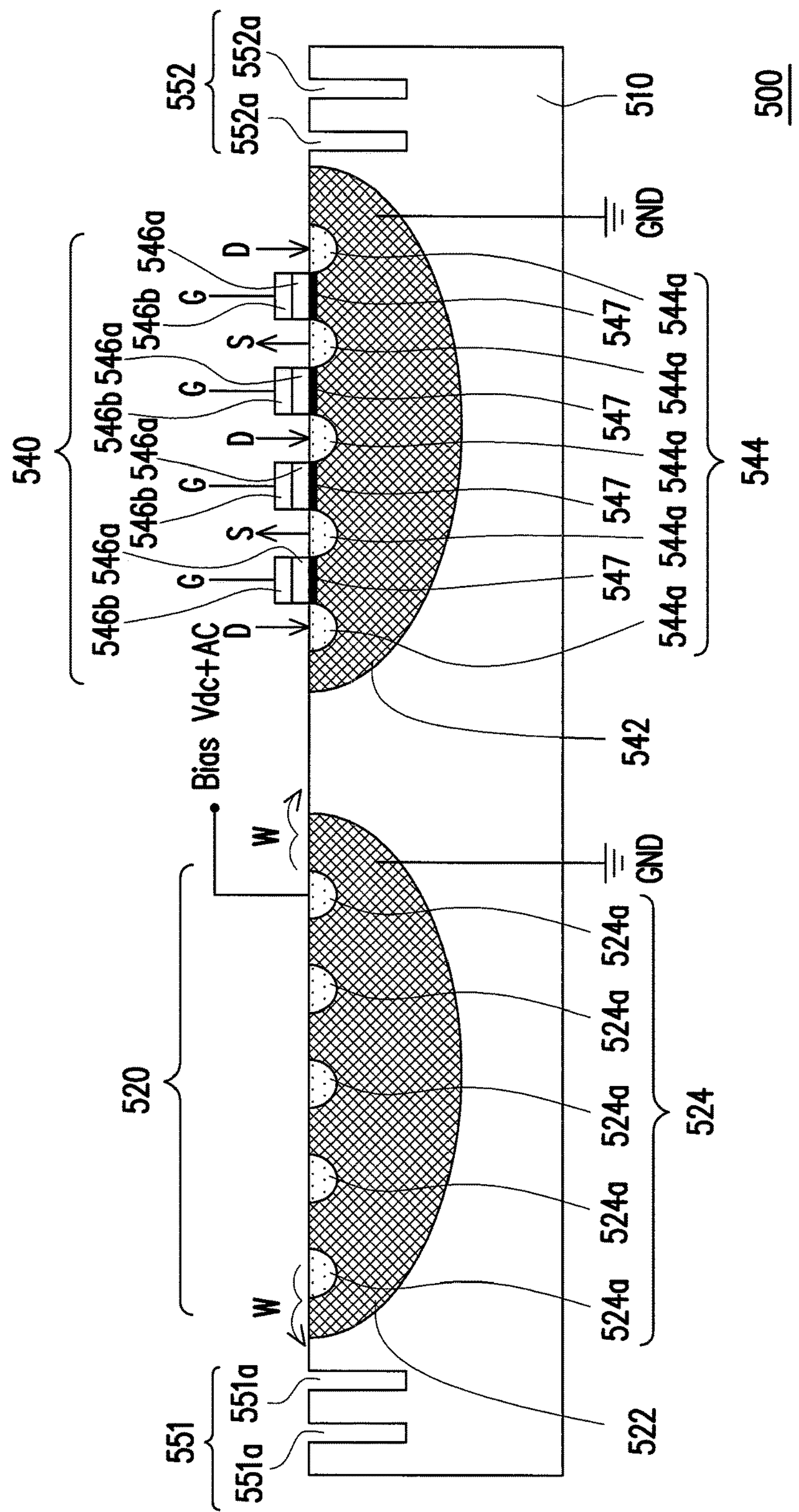
FIG. 8 is a schematic diagram illustrating a surface elastic wave transceiver according to still another embodiment of the application.

FIG. 8 is a schematic diagram illustrating a surface elastic wave transceiver 500 according to still another embodiment of the application. Referring to FIG. 8, the surface elastic wave transceiver 500 includes a substrate 510, a transmitter 520 and a receiver 540, wherein the transmitter 520 is formed in the substrate 510 and includes a first region 522 with a first conductivity type and a first doped region 524 with a second conductivity type, and the first doped region 524 includes a first doping pattern 524*a* periodically implanted on a surface of the first region 522. In addition, the receiver 540 is formed in the substrate 510 and includes a second region 542 with the first conductivity type and a second doped region 544 with the second conductivity type, wherein the second doped region 544 includes a second doping pattern 544*a* periodically implanted on a surface of the second region 542. The surface elastic wave transceiver 500 further includes a plurality of gates G, and second doping patterns 544*a* at two sides of the gates G are being used as sources S and drains D, so that a plurality of field effect transistors is formed on a surface of the receiver 540. Components similar to that of the previous embodiment may have similar structures and similar operating means, and thus are not to be repeated herein. In the present embodiment, the surface elastic wave transceiver 500 further includes a first reflective structure 551 or a second reflective structure 552, which includes a plurality of grooves 551*a* and 552*a* that are parallel to each other, thereby forming a discontinuous structure. In addition, the first reflective structure 551 or the second reflective structure 552 of the present embodiment may also be made of other acoustic impedance materials, such as air, dielectric material or metal, which are different from a material of the substrate. By using the first reflective structure 551 and the second reflective structure 552 to reflect the surface elastic wave W to generate a standing wave with center frequency, and as described in aforementioned embodiment, by disposing the depletion capacitance region generated at the junctions between the first region 522 and the first doped region 524, and between the second region 542 and the second doped region 544, at locations with maximum stress of the standing wave mode, a maximum stress perturbation on the surface of the substrate 510 may be generated, the electron mobility of the channels 547 may be changed, and the alternating current may be generated. Since the standing wave stress on the surface of the substrate may effectively increase the electron mobility of the channels, and the magnitude of the electron mobility is positively correlated to the magnitude of the output current, a resonator with high electromechanical conversion efficiency may further be formed through reflecting and resonating the surface elastic wave to increase the standing wave stress perturbation to the substrate.

In the present embodiment, each gate G further includes a gate dielectric layer 546*a* and a gate electrode 546*b*. The gate dielectric layer 546*a* may, for example, be composed of dielectric material such as silicon dioxide ($SiO_2$), but the application is not limited thereto. Other appropriate materials with high dielectric constant, such as aluminum oxide, hafnium oxide, silicon nitride, silicon oxynitride, or ceramics, may also be adopted. A material of the gate electrodes includes, but not limited to, one of tungsten, aluminum, gold, nickel, platinum, and chromium or an alloy thereof, and indium tin oxide (ITO).

Figure 9:
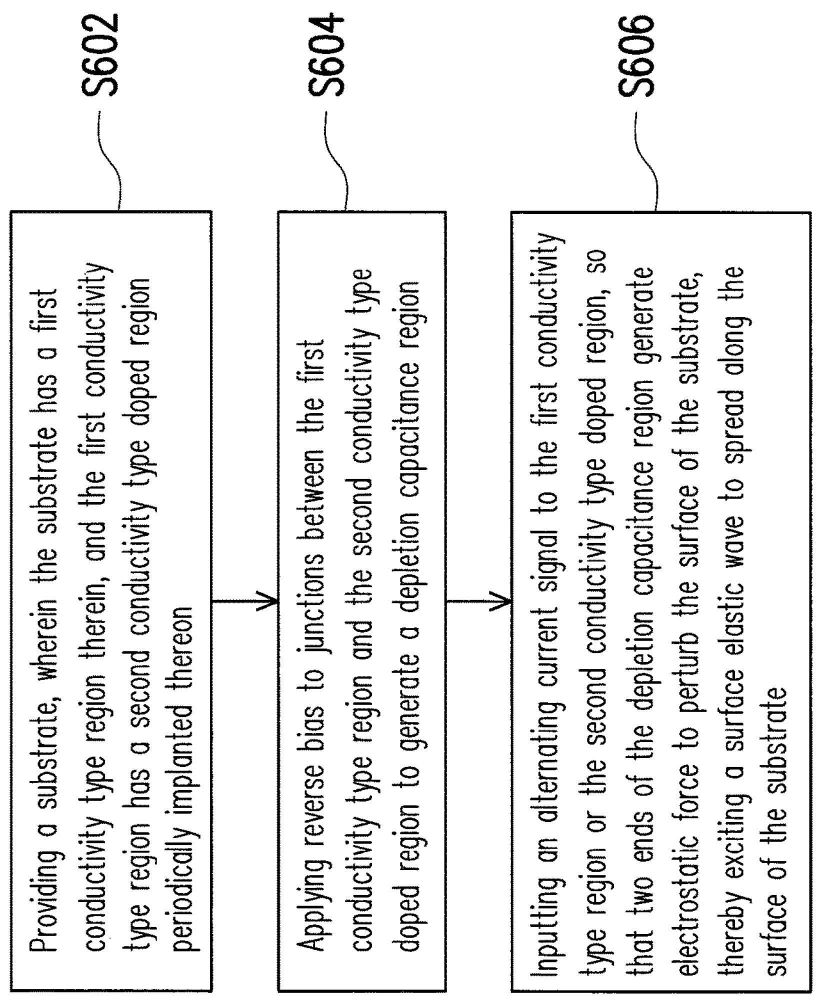
FIG. 9 is a flow chart diagram illustrating a surface elastic wave generation method according to an embodiment of the application.

Taking the structure shown in FIG. 1 and FIG. 2 as an example, a method for generating the surface elastic wave of the application is described in detail below. FIG. 9 is a flow chart diagram illustrating a surface elastic wave generation method according to an embodiment of the application. Referring to FIG. 1, FIG. 2 and FIG. 9, the substrate 110 is provided, the substrate 110 has the first conductivity type region 120 therein, and the first conductivity type region 120 has the second conductivity type doped region 130 periodically implanted thereon (step S602). Next, the reverse bias is applied to the junctions between the first conductivity type region 120 and the second conductivity type doped region 130 to generate the depletion capacitance region (step S604). After step S604, an alternating current signal is inputted to the first conductivity type region 120 or the second conductivity type doped region 130, so that the two ends of the depletion capacitance region generate the electrostatic force, and the generated electrostatic force periodically perturbs the surface of the substrate 110, thereby causing the surface elastic wave W to spread along the surface of the substrate 110 (step S606).

Figure 10:
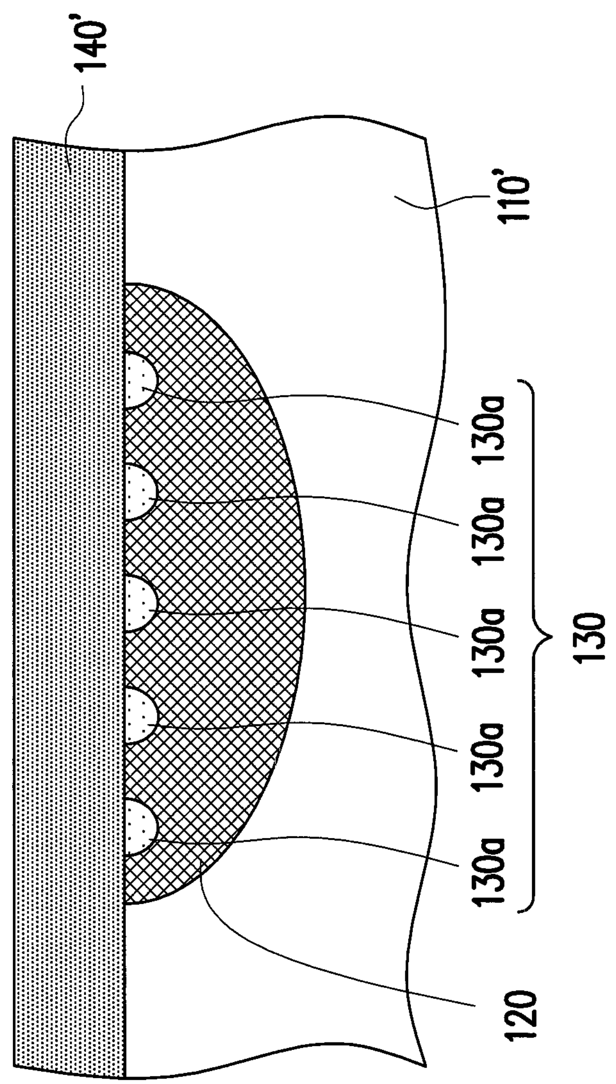
FIG. 10 is a partial schematic cross-sectional diagram illustrating a substrate according to another embodiment of the application.
Figure 11:
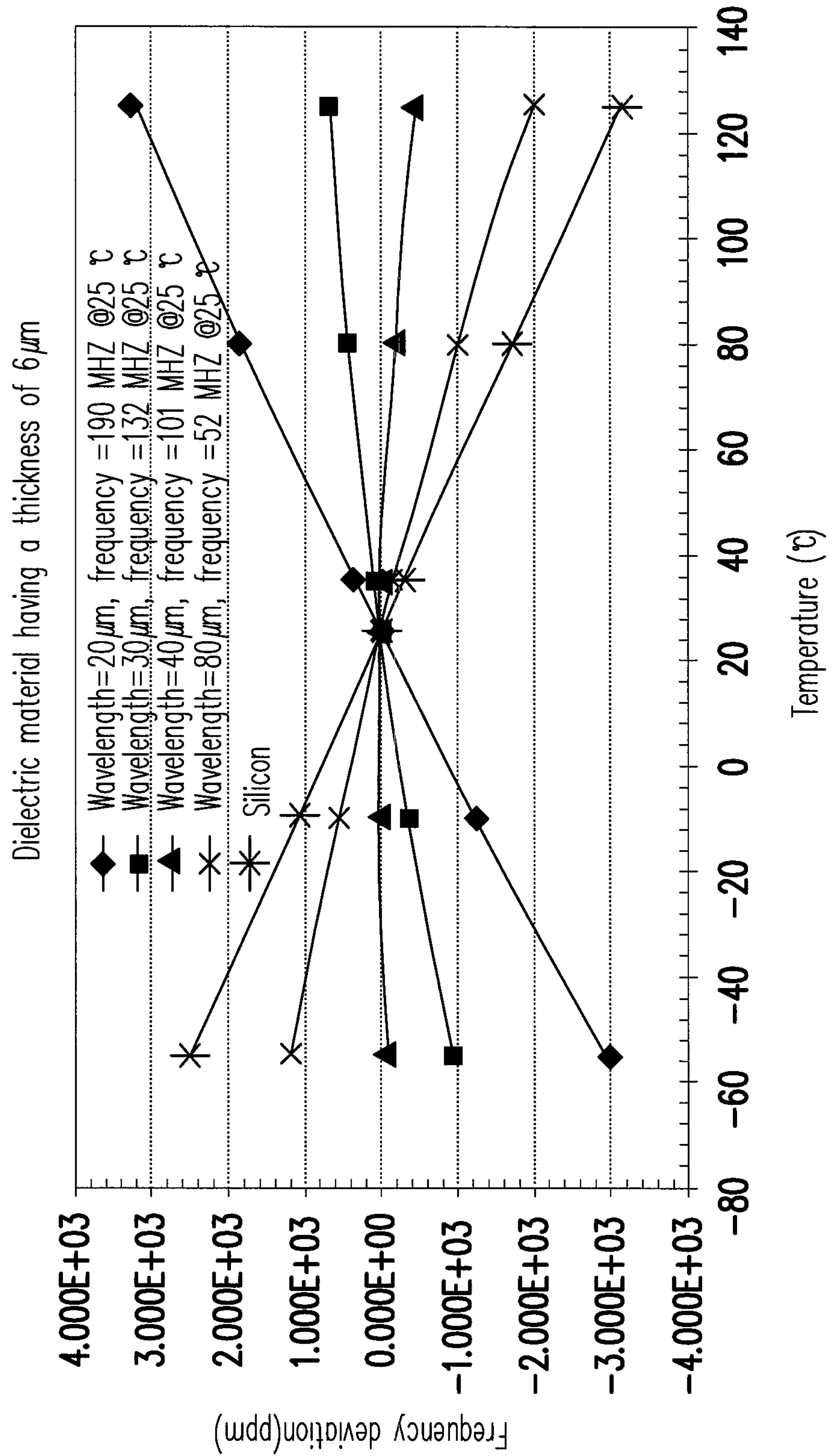
FIG. 11 is a simulation data plot between frequency deviations and temperature changes generated by surface elastic waves with different wavelengths and frequencies on a silicon substrate including or not including layer of dielectric material.
Figure 12:
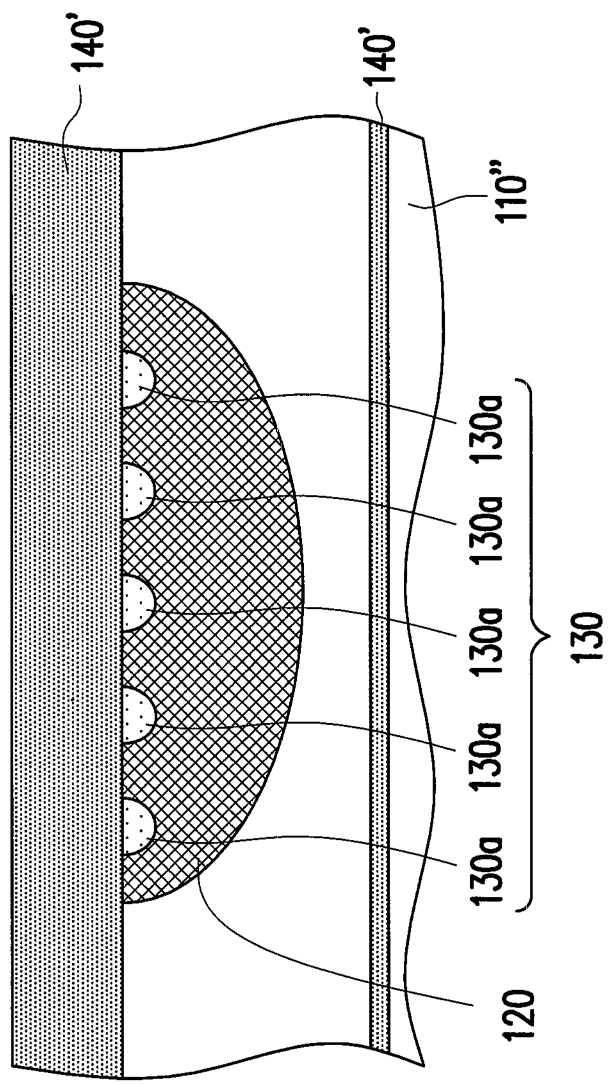
FIG. 12 is a partial schematic cross-sectional diagram illustrating a substrate according to another embodiment of the application.

FIG. 10 is a partial schematic cross-sectional diagram illustrating a substrate according to another embodiment of the application, and FIG. 11 is a simulation data plot between oscillation frequency deviations and temperature changes generated by surface elastic waves with different wavelengths and frequencies on a silicon substrate including or not including layer of dielectric material. Structure and function of the substrate in the embodiment of FIG. 10 are similar to that of the substrate in the embodiment of FIG. 1, and thus identical or similar components are represented by the same or similar annotations and descriptions thereof are not to be repeated herein. A different between the substrate 110' of FIG. 10 and the substrate 110 of FIG. 1 lies in that: the substrate 110' has a layer of dielectric material 140' thereon, wherein a Young's modulus of the dielectric material 140' that varies with the temperature is a positive value, and a Young's modulus of the silicon substrate that varies with the temperature is a negative value. In the present embodiment, the material of the substrate 110' is the same as the material of the substrate 110 in the embodiment of FIG. 1, which is the silicon substrate; and as the temperature changes, the Young's modulus of the substrate 110' that varies with the temperature is a negative value. Therefore, when the dielectric material 140' is deposited on the substrate 110', the change in temperature may cause an opposite stiffness change to the substrate 110' and the dielectric material 140', thereby reducing the stiffness change caused by wave propagation paths formed by the substrate 110' and the dielectric material 140' as the wave propagation paths vary with the temperature, and further reducing the oscillation frequency deviation caused by the surface elastic wave on the substrate 110' due to the change in temperature. In the simulation data plot of FIG. 11, the horizontal axis indicates the temperature (° C.), the vertical axis represents the oscillation frequency deviation (ppm; and df/f represents the ratio of frequency deviation df to oscillation frequency f), wherein when the surface of the silicon substrate is deposited with the dielectric material having a thickness of 6 μm, under 25° C., the surface elastic wave thereof that has a wavelength of 40 μm and a frequency of 101 MHz, as compared to the surface elastic wave of the silicon substrate without being deposited with any dielectric material, has the smallest magnitude of deviation generated by the frequency as relative to the change in temperature. With above the experimental data, it may further explained that, in the present embodiment, the influence of the temperature on the oscillation frequency of the surface elastic wave can be lowered to the minimum by depositing dielectric material on the surface of the substrate and properly adjusting the frequency and wavelength of the surface elastic wave. In the present embodiment, the dielectric material 140' may, for example, be silicon oxide or silicon nitride, but the application is not limited thereto. In addition, in another embodiment (not shown), the dielectric material 140' of FIG. 10 may also be deposited on the substrates of the transmitters and the receivers of the surface elastic wave transceivers in several previously mentioned embodiments, so as to reduce the influence of temperature change on the oscillation frequency of the surface elastic wave. In another embodiment as illustrated in FIG. 12, a substrate 110" may include an insulating layer and becomes a SOI (silicon on insulator) substrate. The use of the SOI substrate may effectively reduce the generation of parasitic capacitance, thereby enhancing the performance of the surface elastic wave generator.

Figure 13:
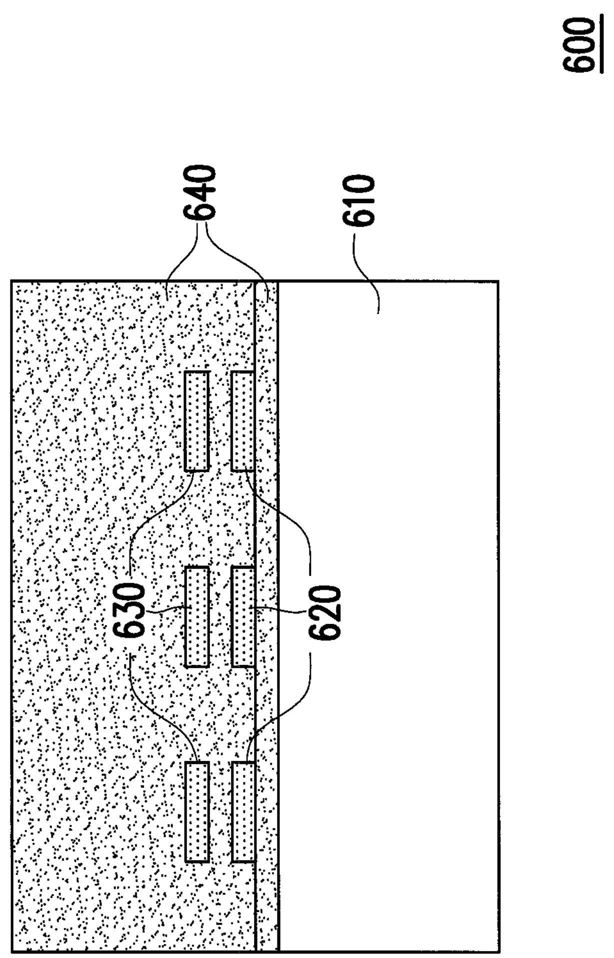
FIG. 13 is a schematic diagram illustrating a surface elastic wave generator according to another embodiment of the application.

FIG. 13 is a schematic diagram illustrating a surface elastic wave generator 600 according to another embodiment of the application. Referring to FIG. 13, the surface elastic wave generator 600 of the present embodiment includes a substrate 610, a first electrode plate set 620, a second electrode plate set 630 and at least one dielectric material 640. The first electrode plate set 620 is disposed on the substrate 610, and the second electrode plate set 630 is disposed above the first electrode plate set 620. The at least one dielectric material 640 are respectively disposed between the substrate 610 and the first electrode plate set 620 and between the first electrode plate set 620 and the second electrode plate set 630. The surface elastic wave generator 600 of the present embodiment may generate a difference between the first electrode plate set 620 and the second electrode plate set 630 through applying bias voltage between the first electrode plate set 620 and second electrode plate set 630, thereby forming a capacitance region. Next, by inputting an AC signal to the first electrode plate set 620 or the second electrode plate set 630, electrostatic force may be generated by the capacitance region between the electrode plates, wherein the size of the electrostatic force is inversely proportional to a distance between the first electrode plate set 620 and the second electrode plate set 630. Then, the generated electrostatic force periodically perturbs the surface of the substrate 610, thereby causing the surface elastic wave W (not shown) to spread along the surface of the substrate 610.

Figure 14:
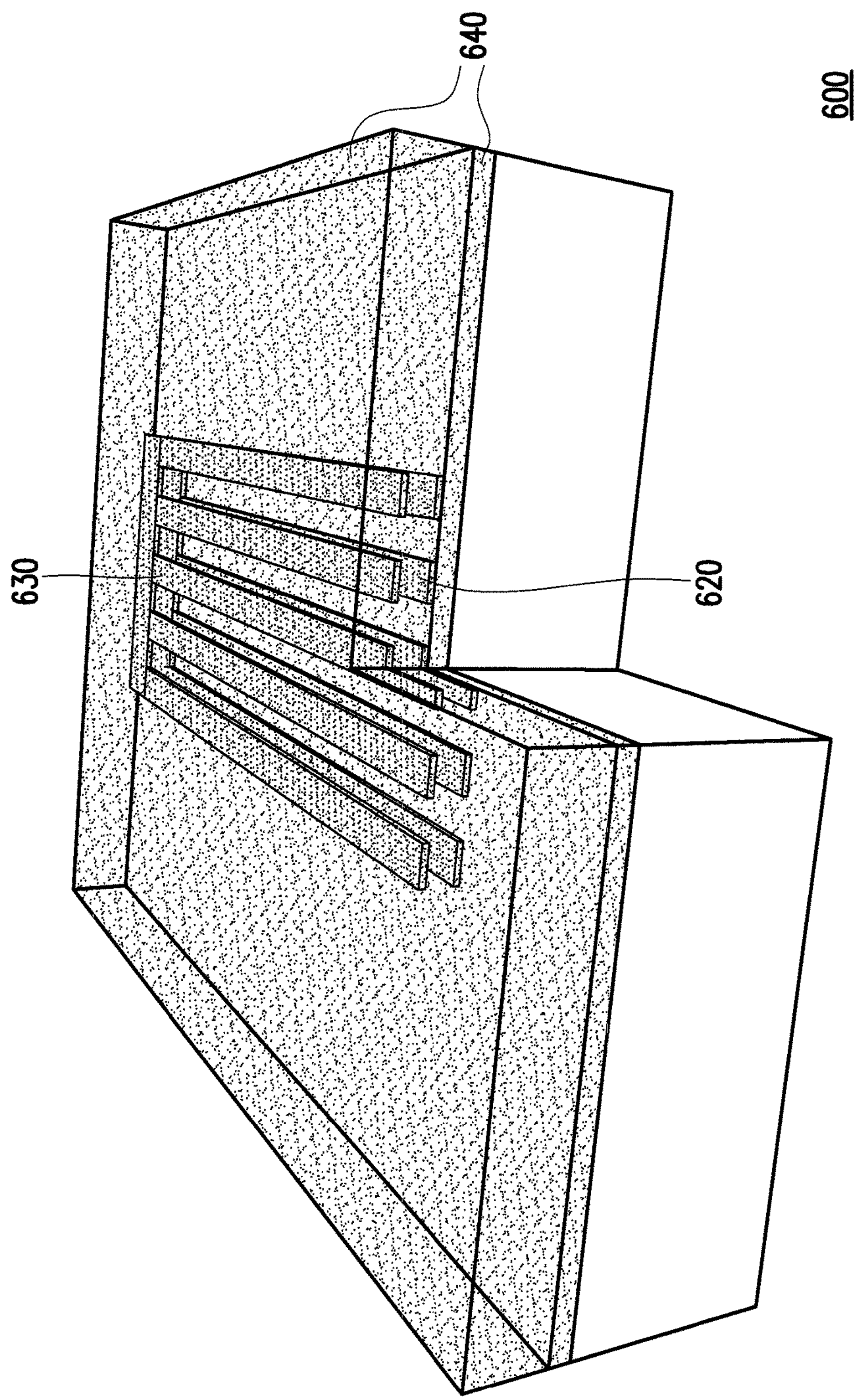
FIG. 14 is a top view of the surface elastic wave generator of FIG. 13.
Figure 15:
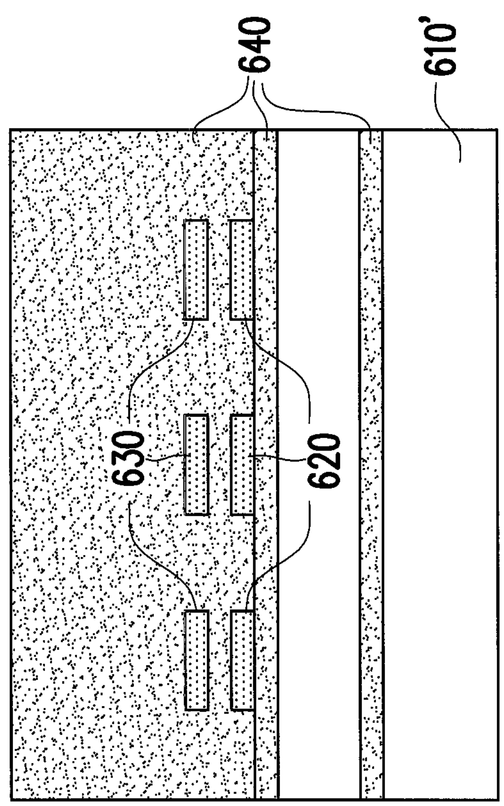
FIG. 15 is a schematic diagram illustrating a substrate of the surface elastic wave generator of FIG. 13 according to another embodiment of the application.

FIG. 14 is a top view of the surface elastic wave generator 600 of FIG. 13, and FIG. 15 is a schematic diagram illustrating a substrate of the surface elastic wave generator of FIG. 13 according to another embodiment of the application. Referring to FIG. 14, in the present embodiment, the first electrode plate set 620 and the second electrode plate set 630 have taken the fork-shapes as an example, but the application is not limited thereto. In another embodiment (not shown), the shape of the first electrode plate set 620 and the second electrode plate set 630 may also be the plurality periodically arranged rectangles. In addition, a material of the substrate 610 of the present embodiment, similar to the previous mentioned embodiments, may also be the silicon substrate with high resistance, so as to effectively inhibit the generation of noise during the process of transmitting the surface elastic wave W. In the another embodiment illustrated FIG. 15, a substrate 610' may further add a layer of dielectric material in the silicon substrate as the insulating layer to form into the SOI substrate, and the use of the SOI substrate may effectively reduce the generation of parasitic capacitance or reduce the oscillation frequency deviation caused by the surface elastic wave on the substrate 610' due to the change in temperature, thereby enhancing the performance of the surface elastic wave generator 600. In the present embodiment, configuration periods between the first electrode plates of the first electrode plate set 620 and the first electrode plates of the second electrode plate set 630 are integer multiples of the wavelength of the surface elastic wave, and a material of the first electrode plate set 620 or the second electrode plate set 630 may be metal or other conductive material, so as to electrically coupled to the voltage source. In addition, another layer of dielectric material 640 may further be disposed on the second electrode plate set 630 to reduce the oscillation frequency deviation caused by the surface elastic wave on the substrate or the substrate 610' due to the change in temperature. The dielectric material 640 of the present embodiment may, for example, be but not limited to silicon oxide, silicon nitride, silicon fluoride glass (FSG), undoped silicon glass (USG), phosphorus, phosphosilicate glass (PSG) or boron phosphorous silica glass (BPSG).

Figure 16:
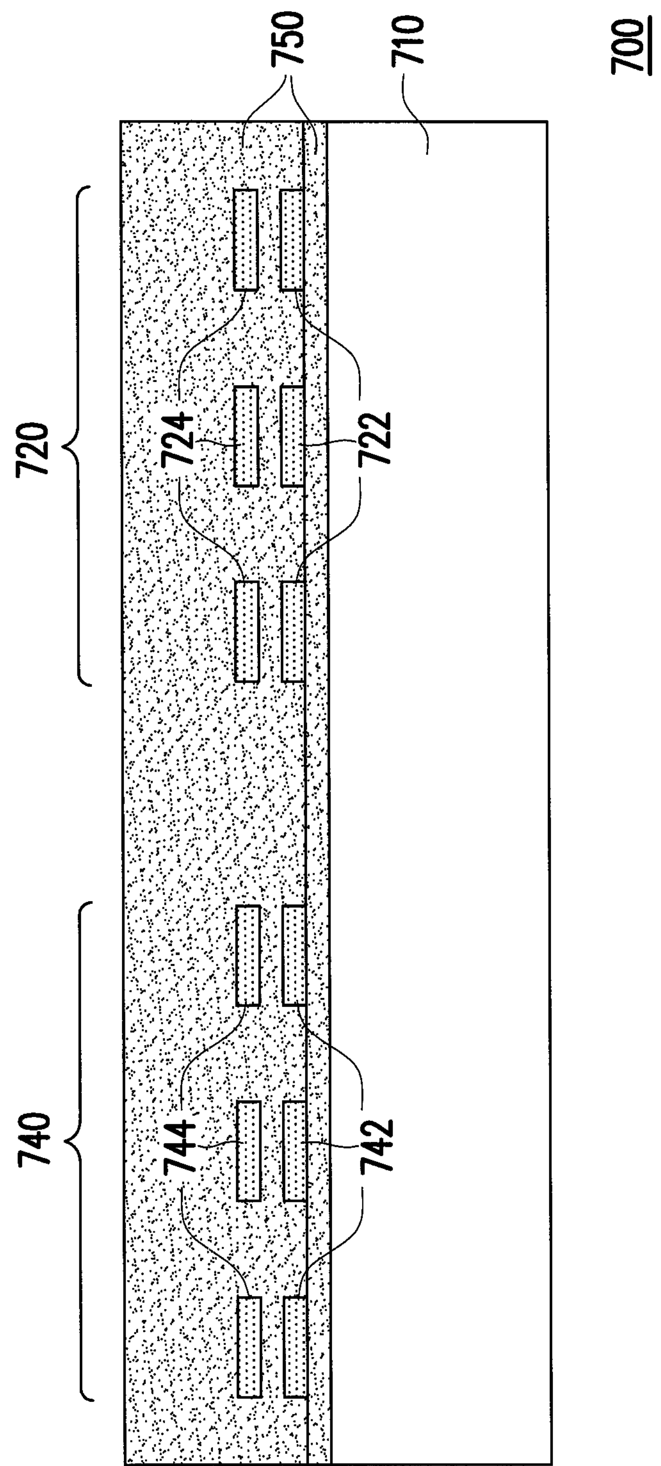
FIG. 16 is a schematic diagram illustrating a surface elastic wave transceiver according to another embodiment of the application.
Figure 17:
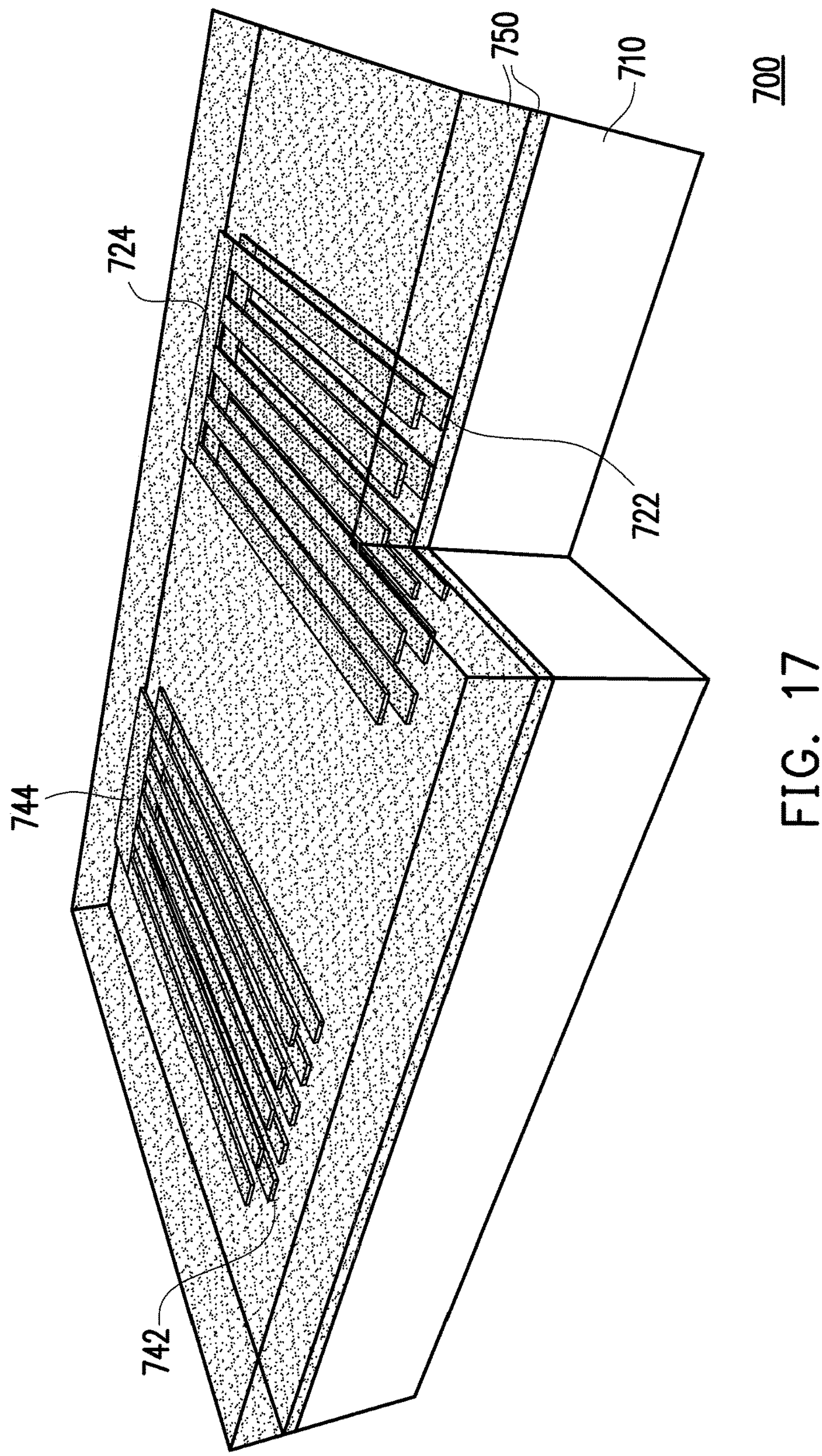
FIG. 17 is a top view of the surface elastic wave transceiver of FIG. 16.

FIG. 16 is a schematic diagram illustrating a surface elastic wave transceiver 700 according to another embodiment of the application, and FIG. 17 is a top view of the surface elastic wave transceiver 700 of FIG. 16. Referring to FIG. 16 and FIG. 17, in the present embodiment, the surface elastic wave transceiver 700 has a substrate 710, a transmitter 720 and a receiver 740. The structure and function of the transmitter 720 of the present embodiment are similar to that of the surface elastic wave generator 600 of the embodiment shown in FIG. 13, and thus are not to be repeated herein. The receiver 740 of the present embodiment may be configured to receive a surface elastic wave W (not shown) generated by the transmitter 720. The receiver 740 includes a third electrode plate set 742 formed on the substrate 710 and a fourth electrode plate set 744 formed above the third electrode plate set 742, and the third electrode plate set 742 and the fourth electrode plate set 744 have a layer of dielectric material 750 therebetween. A difference may be generated between the third electrode plate set 742 and the fourth electrode plate set 744 through applying bias voltage, thereby forming a capacitance region. Next, the receiver 740 receives the surface elastic wave W generated by the transmitter 720; and as the surface elastic wave W perturbs the surface of the substrate 710, a spacing and a capacitance value between the third electrode plate set 742 and fourth electrode plate set 744 are changed, and the receiver 740 outputs a sensing signal. In the present embodiment, the substrate 710 may, for example, be a silicon substrate or a SOI substrate, which are previously described, and the application is not limited thereto. In addition, as similar to the previous embodiment, a layer of dielectric material 750 may further be disposed on the second electrode plate set 724 and the fourth electrode plate set 744, so as to reduce the oscillation frequency deviation caused by the surface elastic wave on the substrate or the substrate 710 due to the change in temperature. A material of the first electrode plate set 722 or the second electrode plate set 724 and a material of the third electrode plate set 742 and the fourth electrode plate set 744 may be metal or other conductive material, so as to be electrically coupled to the voltage source and be configured to apply the voltage between the electrode plate sets. In the present embodiment, a configuration period of the third electrode plate set 742 or the fourth electrode plate set 744 is, as similar to the surface elastic wave generator 600 and the transmitter 720 of the previous embodiments, are integer multiples of the wavelength of the surface elastic wave. The dielectric material 750 of the present embodiment may also, for example, be but not limited to silicon oxide, silicon nitride, FSG, USG, PSG or BPSG.

Figure 18:
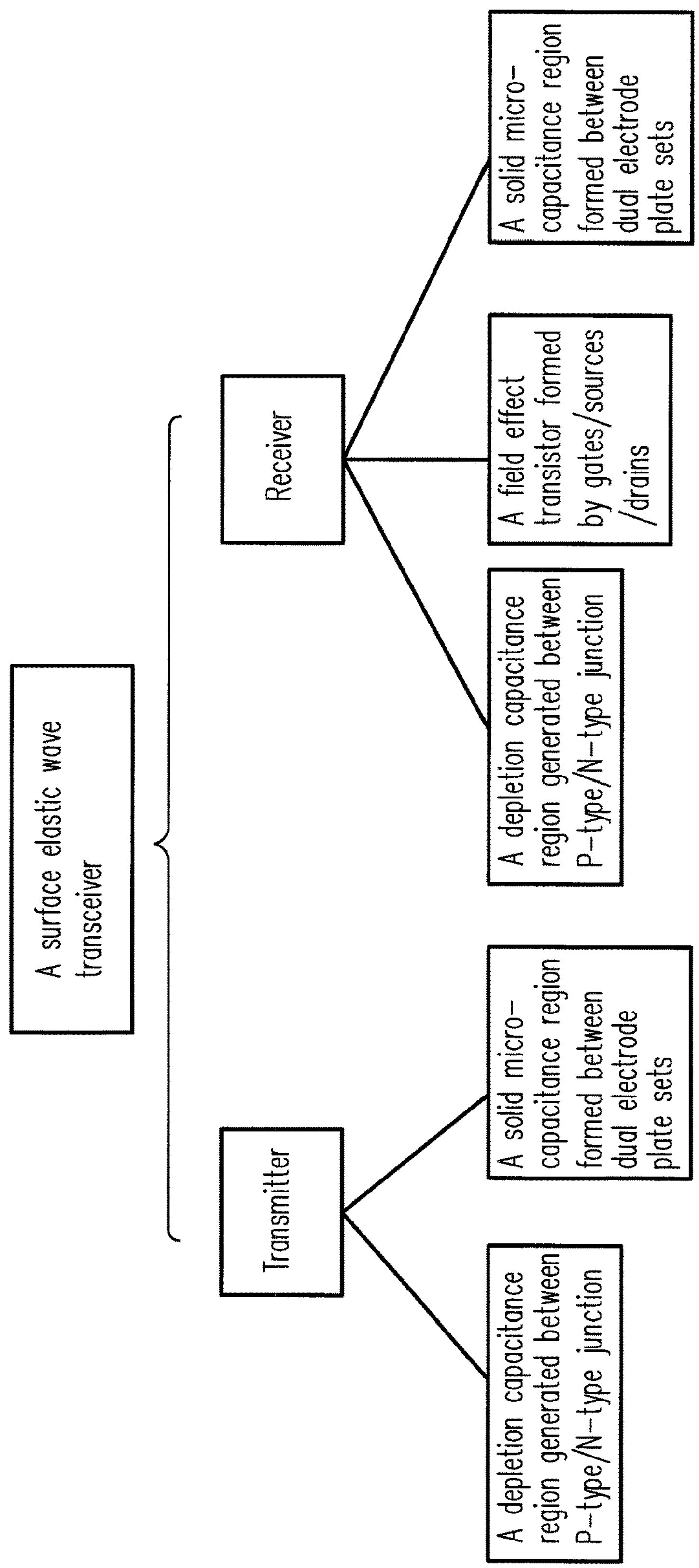
FIG. 18 is a tree diagram illustrating the structure of the surface elastic wave transceiver according to another embodiment of the application.

FIG. 18 is a tree diagram illustrating the structure of the surface elastic wave transceiver according to another embodiment of the application. In the present embodiment, the structure of the surface elastic wave transceiver (not shown) may include a substrate, a transmitter being the surface elastic wave generator 100 or 600 as described in above, and a receiver being the surface elastic wave transceiver 200, 400 or 700 as described in above. It will be apparent to those skilled in the art that, based on the actual needs, various modifications and variations can be made to the structures of the substrate, the transmitter and the receiver of the surface elastic wave transceiver disclosed in the above embodiments without departing from the scope or spirit of the application.

In summary, the surface elastic wave generator of the disclosure forms the first conductivity type region via ion implantation, and implants the second conductivity type doped region on the surface of the first conductivity type region, wherein the depletion capacitance region spacing thereof may be less than 100 nm. Then, through applying the reverse bias to the junctions between the first conductivity type region and the second conductivity type doped region to generate the depletion capacitance region, and through inputting the alternating current signal to generate periodically perturbation to the substrate, the surface elastic wave is exited to spread along the surface of the substrate, The receiver of the surface elastic wave transceiver of the disclosure may have a passive receiver design, namely, similar to the transmitter of the surface elastic wave transceiver that periodically implants the second conductivity type doped region on the surface of the first conductivity type region; and the of the surface elastic wave transceiver applies the reverse bias to generate the depletion capacitance region so as to inductively receive the surface elastic wave from the transmitter. Alternatively, by implanting a plurality of field effect transistors on the surface of the receiver to automatically receive the surface elastic wave from the transmitter, a plurality of channels are generated on the substrate via the gate voltages of the field effect transistors, and the surface elastic wave perturbs the channels via stress, so that the electron mobility of the channels can be changed, and thus the alternating current is generated. In addition, the substrate of the disclosure may be a silicon substrate or SOI substrate, wherein the high resistance characteristics of the silicon substrate can effectively inhibit the feed through of the surface elastic wave from the transmitter to the receiver, while SOI substrate may effectively reduce the generation of parasitic capacitance, thereby enhancing the performance of the surface elastic wave generator. The surface elastic wave transceiver of the disclosure may include the reflective structure at the outside of the substrate, wherein the reflective structure includes a plurality of grooves to form a discontinuous structure, so as to generate the standing wave with center frequency by reflecting the surface elastic wave, and by designing the depletion capacitance region at the location with maximum stress of standing wave mode, a resonator with a better electromechanical conversion efficiency is obtained. The surface elastic wave generator or the surface elastic wave transceiver of the application may also adopt the electrode plate sets as the device and method for generating the electrostatic force and the surface elastic wave.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A surface elastic wave generator comprising:

a substrate;

a first conductivity type region formed in the substrate; and a second conductivity type doped region doped on a surface of the first conductivity type region, a depletion capacitance region being formed through applying reverse bias to junctions between the first conductivity type region and the second conductivity type doped region, a surface elastic wave being generated on the substrate through inputting an alternating current signal to the first conductivity type region or the second conductivity type doped region, wherein the second conductivity type doped region comprising at least one doping pattern.

2. The surface elastic wave generator as recited in claim 1, wherein the substrate is a silicon substrate or a SOI substrate.

3. The surface elastic wave generator as recited in claim 1, wherein one of the first and the second conductivity types is P-type and the other one is N-type.

4. The surface elastic wave generator as recited in claim 1, wherein the second conductivity type doped region appears to be in fork-shapes or a plurality of periodically arranged rectangles.

5. The surface elastic wave generator as recited in claim 1, wherein a period of the at least one doping pattern is an integer multiple of a wavelength of the surface elastic wave.

6. The surface elastic wave generator as recited in claim 1, wherein a period of the at least one doping pattern is twice the wavelength of the surface elastic wave.

7. The surface elastic wave generator as recited in claim 1, wherein the substrate has a layer of dielectric material thereon.

8. The surface elastic wave generator as recited in claim 7, wherein the dielectric material is silicon oxide, silicon nitride, silicon fluoride glass, undoped silicon glass, phosphorus, phosphosilicate glass or boron phosphorous silica glass.

9. A surface elastic wave transceiver comprising:

a substrate;

a transmitter formed in the substrate, the transmitter comprising a first region with a first conductivity type and a first doped region with a second conductivity type, the first doped region comprising at least one first doping pattern doped on a surface of the first region with the first conductivity type, a surface elastic wave being generated through applying reverse bias between the first doped region and the first region and inputting a signal to the first region or the first doped region; and a receiver formed in the substrate, the receiver comprising a second region with the first conductivity type and a second doped region with the second conductivity type, the second doped region comprising at least one second doping pattern doped on a surface of the second region with the first conductivity type.

10. The surface elastic wave transceiver as recited in claim 9, wherein the substrate is a silicon substrate or a SOI substrate.

11. The surface elastic wave transceiver as recited in claim 9, wherein one of the first and the second conductivity types is P-type and the other one is N-type.

12. The surface elastic wave transceiver as recited in claim 9, wherein the first doped region and the second doped region respectively appear to be in fork-shapes or a plurality of periodically arranged rectangles, and the first doping patterns and the second doping patterns respectively are a plurality of fork portions or extending portions, extending parallelly to each other.

13. The surface elastic wave transceiver as recited in claim 9, wherein the receiver further comprises a gate located at a surface of the substrate be-tween the second doping patterns, and the second doping patterns at two sides of the gate are respectively being used as a source and a drain to form a plurality of field effect transistors.

14. The surface elastic wave transceiver as recited in claim 9 further comprising a first reflective structure and a second reflective structure formed in the substrate, and the receiver and the transmitter located between the first reflective structure and the second reflective structure.

15. The surface elastic wave transceiver as recited in claim 14, wherein the first reflective structure or the second reflective structure comprises a plurality of grooves being parallel to each other.

16. The surface elastic wave transceiver as recited in claim 14, wherein the first reflective structure or the second reflective structure comprises at least one acoustic impedance material different from a material of the substrate.

17. The surface elastic wave transceiver as recited in claim 16, wherein the at least one acoustic impedance material different from the material of the substrate is air, dielectric material or metal.

18. The surface elastic wave transceiver as recited in claim 13, wherein the gate comprises a gate dielectric layer and a gate electrode, wherein the gate dielectric layer is located between the gate electrode and the substrate.

19. The surface elastic wave transceiver as recited in claim 13, wherein the source and the drain respectively appear in cross-fork-shapes that are al-ternately arranged in parallel to each other, and the gate is located between the source and the drain.

20. The surface elastic wave transceiver as recited in claim 13 further comprising a first reflective structure and a second reflective structure formed in the substrate, and the receiver and the transmitter located between the first reflective structure and the second reflective structure.

21. The surface elastic wave transceiver as recited in claim 20, wherein the first reflective structure or the second reflective structure comprises a plurality of grooves being parallel to each other.

22. The surface elastic wave transceiver as recited in claim 20, wherein the first reflective structure or the second reflective structure comprises at least one acoustic impedance material different from a material of the substrate.

23. The surface elastic wave transceiver as recited in claim 22, wherein the at least one acoustic impedance material different from the material of that substrate is air, dielectric material or metal.

24. The surface elastic wave transceiver as recited in claim 9, wherein the substrate has a layer of dielectric material thereon.

25. The surface elastic wave transceiver as recited in claim 24, wherein the dielectric material is silicon oxide, silicon nitride, silicon fluoride glass, undoped silicon glass, phosphorus, phosphosilicate glass or boron phosphorous silica glass.

26. A surface elastic wave generation method comprising:

providing a substrate, wherein the substrate has a first conductivity type region, a surface of the first conductivity type region has a second conductivity type doped region, and the second conductivity type doped region comprises at least one doping pattern;

applying reverse bias to junctions between the first conductivity type region and the second conductivity type doped region so as to generate a depletion capacitance region; and inputting a signal to the first conductivity type region or the second conductivity type doped region, and an acting force generated at two ends of the depletion capacitance region, wherein the acting force perturbs a surface of the substrate, thereby causing the surface elastic wave to spread along the surface of the substrate.

27. The surface elastic wave generation method as recited in claim 26, wherein the second conductivity type doped region appears to be in fork-shapes or a plurality of periodically arranged rectangles.

28. The surface elastic wave generation method as recited in claim 26, wherein the substrate has a layer of dielectric material thereon.

29. The surface elastic wave generation method as recited in claim 28, wherein the dielectric material is silicon oxide, silicon nitride, silicon fluoride glass, undoped silicon glass, phosphorus, phosphosilicate glass or boron phosphorous silica glass.

30. A surface elastic wave transceiver comprising:

a substrate;

a transmitter being a surface elastic wave generator, the surface elastic wave generator comprising:

a first conductivity type region formed in the substrate; and a second conductivity type doped region comprising at least one doping pattern doped on a surface of the first conductivity type region, a depletion capacitance region being formed through applying reverse bias to junctions between the first conductivity type region and the second conductivity type doped region, a surface elastic wave being generated on the substrate through inputting a signal to the first conductivity type region or the second conductivity type doped region; and a receiver formed on the substrate and adapted to receive the surface elastic wave generated by the transmitter, the receiver comprising:

a first electrode plate set formed on the substrate; and a second electrode plate set formed above the first electrode plate set, wherein at least one dielectric material are respectively disposed between the substrate and the first electrode plate set and between the first electrode plate set and the second electrode plate set, wherein a difference is generated between the first electrode plate set and the second electrode plate set through applying bias voltage.

* * * * *